No. 843,024. PATENTED FEB. 5, 1907.
T. J. LIVINGSTON.
FIGURE TOY.
APPLICATION FILED NOV. 20, 1906.

Witnesses

Inventor
Thomas J. Livingston,
By Franklin H. Hough
Attorney

UNITED STATES PATENT OFFICE.

THOMAS JOHN LIVINGSTON, OF FITZGERALD, GEORGIA.

FIGURE TOY.

No. 843,024.　　　　Specification of Letters Patent.　　　　Patented Feb. 5, 1907.

Application filed November 20, 1906. Serial No. 344,289.

*To all whom it may concern:*

Be it known that I, THOMAS JOHN LIVINGSTON, a citizen of the United States, residing at Fitzgerald, in the county of Irwin and State of Georgia, have invented a certain new and useful Improvement in Figure Toy; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in figured toys; and the object of the invention is to produce a simple and efficient device of this nature consisting of a continuously-feeding apparatus comprising an endless carrier to which bunches indicating food are attached and adapted to be carried into the mouth of the animal, the lips and head of the figure being pivotally mounted in order to give the appearance of the natural movements of the lips and head while eating.

The invention comprises various other details of construction and combinations and arrangements of parts, which will be hereinafter fully described and then specifically defined in the appended claim.

I illustrate my invention in the accompanying drawings, in which—

Figure 1:
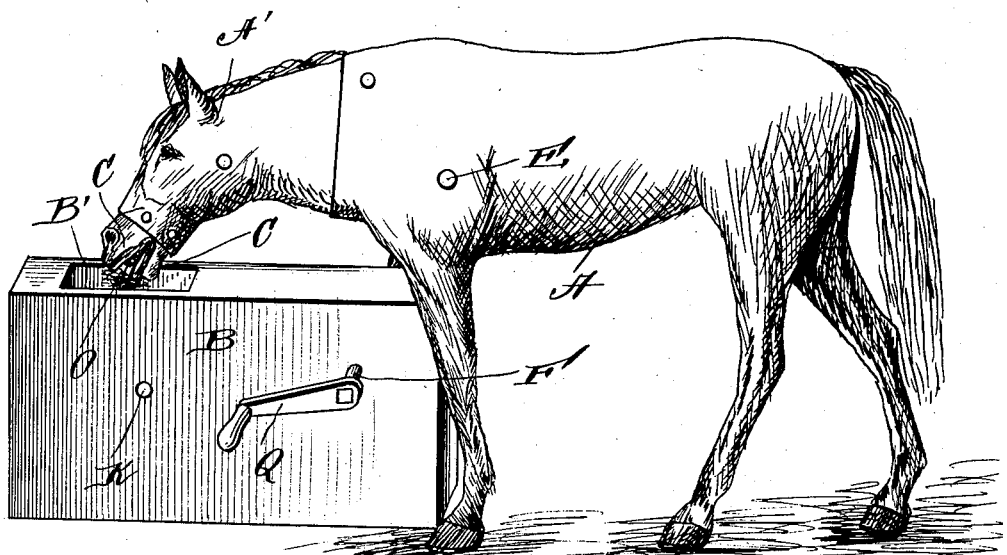
Figure 2:
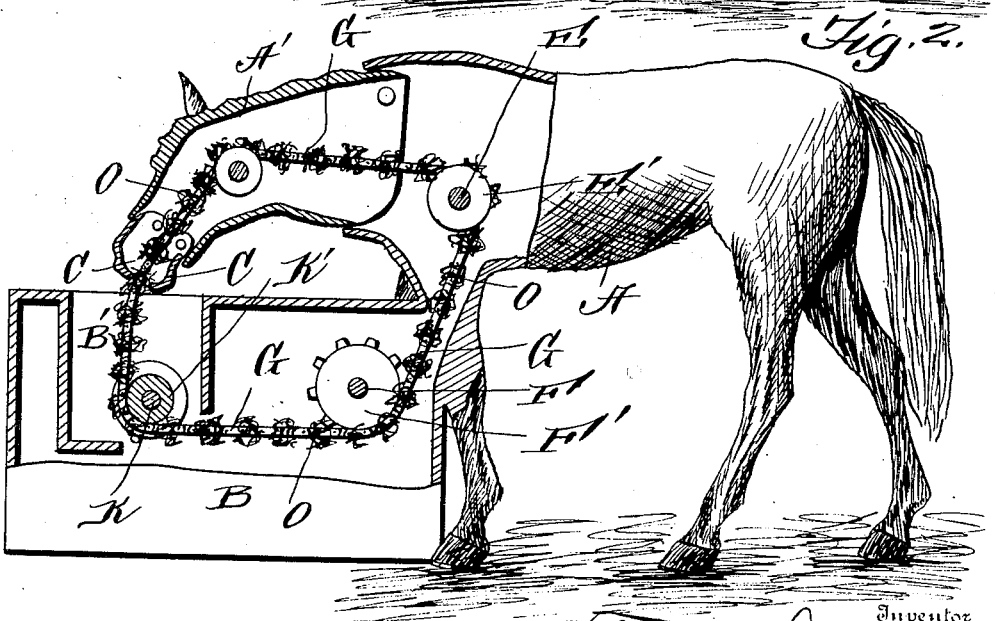

Figure 1 is a perspective view of the animal, showing the feeding trough or stall out of which the food passes into the mouth of the animal; and Fig. 2 is a vertical sectional view through the animal and the feed-stall.

Reference now being had to the details of the drawings by letter, A designates the body of an animal, which in the drawings is made to represent that of a horse, although it will be understood that the apparatus may be applied to any kind of an animal.

B is a feed-stall having an opening B', through which the feed passes from the feed stall or box into the mouth of the animal.

The head A' of the animal is pivotally mounted in order to have a swinging movement, and also the lips C are pivoted and adapted to be moved by the bunches of food which enter the mouth and serve to give a life-like movement to the parts.

Fixed to a shaft E, journaled in the side walls of the body of the animal, is a drum E', and F is a shaft journaled in suitable bearings in said feed stall or box.

F' is a sprocket-wheel fixed to said shaft F, and G is an endless band having perforations therein adapted to engage the teeth of said sprocket-wheel, and K designates a shaft also mounted in the side walls of the feed stall or box and to which a drum K' is fixed. Said band G has bunches of artificial food O secured thereto its entire length and passes through between the lips of the animal and over the drum and thence down through an opening in the bottom of the body and into the rear end of the box, thereby concealing the exit movement of the food back into the box, the bunches of food only being visible as they pass into the mouth of the animal and, coming in contact with the pivotal lips, cause the same to tilt and also the head, thereby giving a natural life-like appearance to the animal as though eating. A crank or handle Q is fastened to the shaft F, whereby the latter may be rotated and the band made to travel.

While I have described the device as operated by means of a hand-crank, it will at once be evident that clockwork mechanism or any other suitable source of power may be substituted therefor.

What I claim is—

A figure toy consisting of a body portion of an animal, a pivotal head thereon, pivotal lips upon said head, a drum mounted therein, a feed-box having an opening in its top, a shaft mounted in the side walls of the box, a sprocket-wheel fixed to said shaft, a drum also mounted between the walls of the box, an endless band passing over said drums and sprocket-wheel, and bunches representing artificial food fastened to the band and adapted to move said pivotal lips of the animal as they pass into the mouth of the latter, as set forth.

In testimony whereof I hereunto affix my signature in the presence of two witnesses.

THOMAS JOHN LIVINGSTON.

Witnesses:
J. L. GOOGE,
J. W. RODWELL.